United States Patent
Blinkov et al.

(10) Patent No.: US 11,834,167 B2
(45) Date of Patent: Dec. 5, 2023

(54) HYBRID FIXED VTOL AIRCRAFT POWERED BY HEAVY FUEL ENGINE

(71) Applicant: Sierra Nevada Corporation, Sparks, NV (US)

(72) Inventors: Mikhail Blinkov, Hayward, CA (US); Curtis Leo, Los Gatos, CA (US); Stephen Morris, Sunnyvale, CA (US)

(73) Assignee: Sierra Nevada Corporation, Sparks, NV (US)

( * ) Notice: Subject to any disclaimer, the term of this patent is extended or adjusted under 35 U.S.C. 154(b) by 241 days.

(21) Appl. No.: 17/245,982

(22) Filed: Apr. 30, 2021

(65) Prior Publication Data
US 2021/0339853 A1 Nov. 4, 2021

Related U.S. Application Data

(60) Provisional application No. 63/018,387, filed on Apr. 30, 2020.

(51) Int. Cl.
| | | |
|---|---|---|
| *B64C 29/00* | (2006.01) | |
| *B64D 31/06* | (2006.01) | |
| *B64D 27/24* | (2006.01) | |
| *B64U 10/20* | (2023.01) | |
| *B64U 30/20* | (2023.01) | |
| *B64U 50/11* | (2023.01) | |
| *B64U 50/13* | (2023.01) | |
| *B64U 50/19* | (2023.01) | |
| *B64D 27/02* | (2006.01) | |

(52) U.S. Cl.
CPC .......... *B64C 29/0025* (2013.01); *B64D 27/24* (2013.01); *B64D 31/06* (2013.01);
(Continued)

(58) Field of Classification Search
CPC .. B64D 27/24; B64D 2027/026; B64D 31/06; B64U 50/11; B64U 50/19; B64U 50/33; F16D 43/20–218
See application file for complete search history.

(56) References Cited

U.S. PATENT DOCUMENTS 2,633,923 A * 4/1953 Hartz .................. B63H 20/20
416/169 R
10,371,066 B2   8/2019 Steinwandel et al.
(Continued)

FOREIGN PATENT DOCUMENTS

WO   WO-2018/076047 A1   5/2018

*Primary Examiner* — Joshua J Michener
*Assistant Examiner* — Arfan Y. Sinaki
(74) *Attorney, Agent, or Firm* — Mintz Levin Cohn Ferris Glovsky and Popeo, P.C.

(57) ABSTRACT

A VTOL drone aircraft can include a rechargeable battery, a primary processor, lift propellers, an internal combustion engine with a thrust propeller, a generator, and a power regulation controller. The generator can receive power from the internal combustion engine and deliver electrical power to the rechargeable battery, the lift propellers, or both. The power regulation controller can regulate dynamically power delivery from the internal combustion engine to the thrust propeller and the generator, and from the generator to the rechargeable battery based upon changing conditions during flight. The power regulation controller can prevent operation of the generator when peak power is needed from the internal combustion engine for the thrust propeller. The power regulation controller can also control a clutch coupled to the thrust propeller to regulate the delivery of power to the thrust propeller when the internal combustion engine is active.

18 Claims, 5 Drawing Sheets

(52) U.S. Cl.
CPC ........ *B64U 10/20* (2023.01); *B64D 2027/026* (2013.01); *B64U 30/20* (2023.01); *B64U 50/11* (2023.01); *B64U 50/13* (2023.01); *B64U 50/19* (2023.01)

(56) References Cited

U.S. PATENT DOCUMENTS

| | | | |
|---|---|---|---|
| 2016/0236774 A1 | 8/2016 | Niedzballa | |
| 2016/0325834 A1 | 11/2016 | Foster | |
| 2017/0029131 A1* | 2/2017 | Steinwandel | B64D 27/24 |
| 2017/0321601 A1* | 11/2017 | Lafargue | F02C 6/206 |
| 2018/0065740 A1* | 3/2018 | Vondrell | B64C 29/0033 |
| 2018/0283292 A1* | 10/2018 | Steinwandel | F02D 29/02 |
| 2019/0023408 A1* | 1/2019 | Murrow | B64C 3/38 |
| 2019/0084684 A1* | 3/2019 | Eller | B64D 27/24 |
| 2019/0118943 A1 | 4/2019 | Machin et al. | |
| 2019/0127056 A1* | 5/2019 | Weekes | B64C 27/26 |
| 2019/0263519 A1* | 8/2019 | Argus | B64D 31/06 |
| 2019/0375495 A1 | 12/2019 | Pfammatter et al. | |
| 2021/0078700 A1* | 3/2021 | Klemen | B60L 53/20 |
| 2021/0122465 A1* | 4/2021 | Saias | B64C 27/26 |
| 2021/0276723 A1* | 9/2021 | Han | B64C 39/024 |
| 2021/0323691 A1* | 10/2021 | Foster | B64D 27/04 |
| 2021/0387723 A1* | 12/2021 | Moon | B64D 35/08 |

* cited by examiner

HYBRID FIXED VTOL AIRCRAFT POWERED BY HEAVY FUEL ENGINE

CROSS-REFERENCE TO RELATED APPLICATIONS

This application claims the benefit of U.S. Provisional Application No. 63/018,387, filed Apr. 30, 2020, which is hereby incorporated by reference in its entirety.

TECHNICAL FIELD

The present disclosure relates generally to drone aircraft, and more particularly to VTOL drone aircraft having multiple types of power sources.

BACKGROUND

Drone aircraft can be useful in a variety of utility functions. In particular, vertical take off and landing ("VTOL") drone aircraft can be especially useful in delivering a payload or other cargo due to the ability of these drones to land vertically for delivery in a relatively small space. In addition to the multiple electrically powered lift propellers that are typical for such drones, some VTOL drone aircraft can also include a fixed wing design and an alternative form of thrust for efficiency in traveling longer distances. Such an alternative may include a fossil fuel burning internal combustion engine arranged to provide horizontal thrust, resulting in a hybrid drone aircraft.

Redundancies and inefficiencies in the use of multiple power sources can arise for various types of hybrid drone aircraft. For example, fuel can sometimes be wasted when the internal combustion engine is powered up but most or all of the lift or maneuvering is being provided by electrically powered lift propellers, ailerons, rudders, and the like. Inefficient or suboptimal battery recharging may also arise, such as where additional recharging power is provided to a battery when the battery is full or nearly full, or when a battery is allowed to drop to dangerously low levels despite prior opportunities to recharge the battery during a given mission.

Although prior types of hybrid drone aircraft have worked well in the past, improvements are always helpful. In particular, what is desired are improved hybrid VTOL drone aircraft having multiple different types of power sources that are more efficient and intelligent in the generation and distribution of power throughout the aircraft.

SUMMARY

It is an advantage of the present disclosure to provide improved drone aircraft having multiple different types of power sources. The disclosed features, apparatuses, systems, and methods provide improved hybrid VTOL drones that are more efficient and intelligent in the generation and distribution of power throughout the aircraft during flight. These advantages can be accomplished in multiple ways, such as by use of a dedicated power regulation controller that directs the generation, use, and storage of power in the aircraft in a dynamic manner that varies based on changing conditions.

In various embodiments of the present disclosure, a VTOL drone aircraft can include a rechargeable battery, a primary processor, a plurality of lift propellers, an internal combustion engine, a generator, and a power regulation controller. The rechargeable battery can be configured to deliver electrical power to the VTOL drone aircraft. The primary processor can be powered by the rechargeable battery and can direct overall operations of the VTOL drone aircraft. The lift propellers can be in communication with the primary processor, be powered by the rechargeable battery, and can provide vertical lift for the VTOL drone aircraft. The internal combustion engine can be in communication with the primary processor and can include a thrust propeller that provides horizontal thrust for the VTOL drone aircraft. The generator can be configured to receive power from the internal combustion engine and deliver electrical power to the rechargeable battery to recharge the rechargeable battery. The power regulation controller can be in communication with the primary processor, the rechargeable battery, the internal combustion engine, and the generator. In addition, the power regulation controller can be configured to regulate dynamically power delivery from the internal combustion engine to the thrust propeller and the generator, and from the generator to the rechargeable battery based upon changing conditions during flight of the VTOL drone aircraft.

In various detailed embodiments, the generator can also be configured to deliver electrical power directly to the plurality of lift propellers under direction of the power regulation controller. The power regulation controller can prevent operation of the generator when peak power is needed from the internal combustion engine for the thrust propeller. The internal combustion engine can be a heavy fuel engine powered by diesel fuel, biodiesel fuel, kerosene, JP-5 fuel, or JP-8 fuel, among other possible fuels. In some arrangements, only electrical power is used to provide vertical lift to the VTOL drone aircraft, and/or only internal combustion power is used to provide horizontal thrust to the VTOL drone aircraft. Also, the power regulation controller can be configured to alter its power regulation operations based on different cargo contents carried by the VTOL drone aircraft. The generator can be further configured to receive power from the rechargeable battery and deliver auxiliary power to the thrust propeller. The power regulation controller can direct power delivery from the generator to the rechargeable battery until the rechargeable battery is full, or until the rechargeable battery is recharged to a level to provide sufficient electrical power to the lift propellers for landing the VTOL drone aircraft. The power regulation controller can be further configured to alter the blade pitch of the thrust propeller.

In further detailed embodiments, the VTOL drone aircraft can include a clutch coupled to the thrust propeller. The power regulation controller can be in communication with the clutch and configured to disengage the clutch by a variable amount to limit the delivery of power to the thrust propeller when the internal combustion engine is active. The power regulation controller can also be configured to fully disengage the clutch and direct a full power use of the internal combustion engine to deliver no power to the thrust propeller and full power to the generator. The power regulation controller can also be configured to fully disengage the clutch when the VTOL drone aircraft is operating in a hover mode.

In further embodiments of the present disclosure, various methods of regulating power delivery in a VTOL drone are provided. Method steps can include delivering electrical power from a rechargeable battery to a plurality of lift propellers, disengaging a clutch coupled to a thrust propeller powered by an internal combustion engine, running the internal combustion engine while the clutch is disengaged, wherein no power is provided to the thrust propeller while the clutch is disengaged, receiving power from the internal combustion engine at a generator, and delivering electrical power from the generator directly to the plurality of lift propellers to reduce the amount of electrical power needed from the rechargeable battery. Each of these method steps can be controlled automatically by a power regulation controller during a vertical take-off process of the VTOL drone aircraft. At this time, the internal combustion engine can be run at full capacity to provide maximum load to the generator. Delivery of electrical power from the generator can also include delivering electrical power to the rechargeable battery.

Another method step can involve engaging the clutch while the internal combustion engine remains running, with this being controlled automatically by the power regulation controller during a transition of the VTOL drone aircraft from the vertical take-off process to a wing-borne flight process. Further method steps can include adjusting the amount of power received at the generator from the internal combustion engine and delivering electrical power from the generator to the rechargeable battery to recharge the rechargeable battery to a sufficient level, with these further steps being controlled automatically by the power regulation controller while the VTOL drone aircraft is in a cruise flight mode. Still further method steps can include re-disengaging the clutch, running the internal combustion engine while the clutch is re-disengaged, wherein no power is provided to the thrust propeller while the clutch is re-disengaged, receiving power from the internal combustion engine at the generator, and delivering electrical power from the generator directly to the plurality of lift propellers to reduce the amount of electrical power needed from the rechargeable battery. Each of these further steps can be controlled automatically by a power regulation controller during a landing process of the VTOL drone aircraft.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for a hybrid VTOL drone aircraft. These drawings in no way limit any changes in form and detail that may be made to the disclosure by one skilled in the art without departing from the spirit and scope of the disclosure.

DETAILED DESCRIPTION

Figure 1:
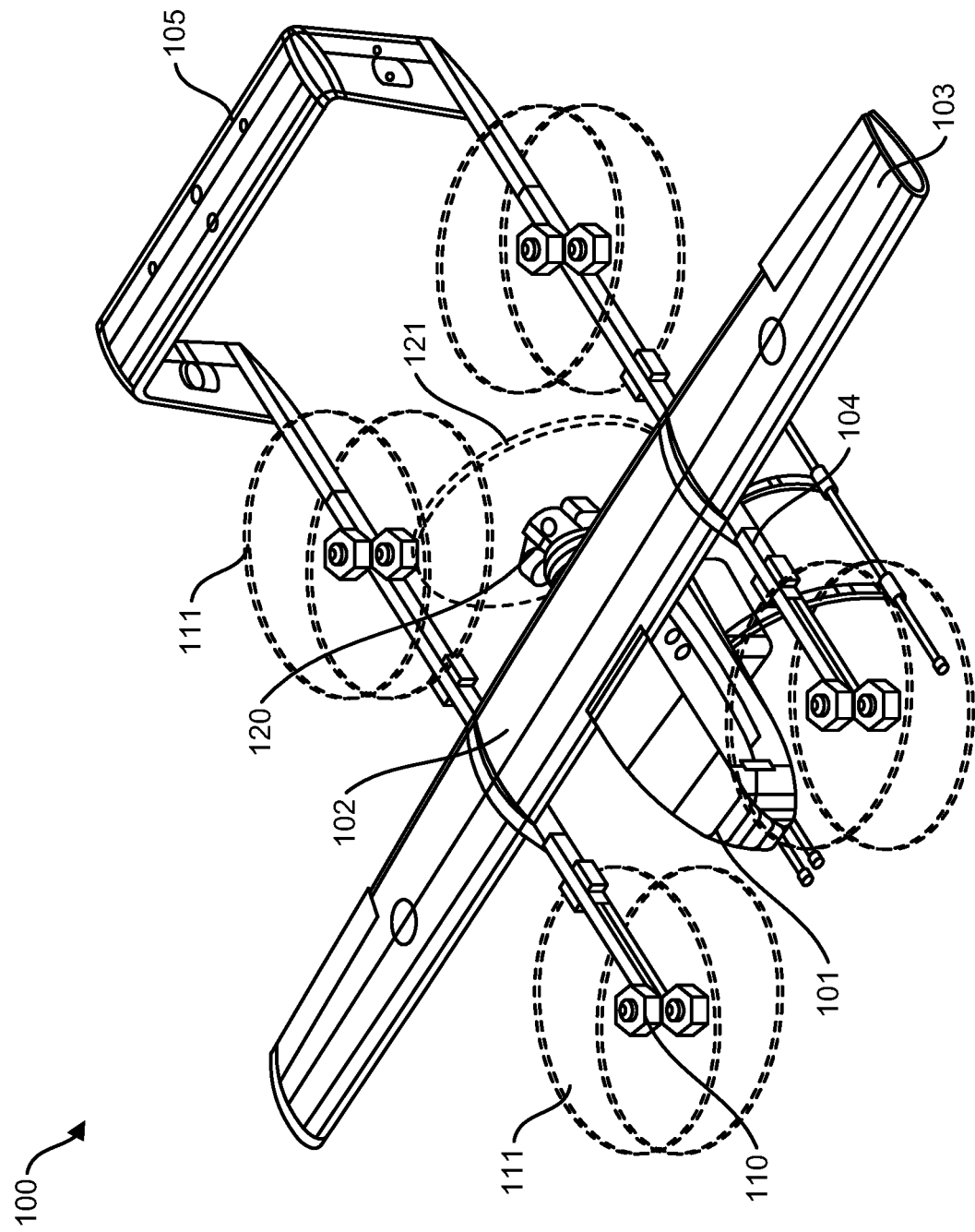
FIG. 1 illustrates in front perspective view an example hybrid VTOL drone aircraft according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for a hybrid drone aircraft having multiple disparate power sources. The disclosed embodiments can provide VTOL drones that are more efficient and intelligent in the generation and distribution of power throughout the aircraft during flight. In particular, the disclosed embodiments can utilize a computing architecture that includes a dedicated power regulation controller that directs the generation, use, and storage of power in the aircraft in a dynamic manner.

In various detailed examples, which are merely illustrative and non-limiting in nature, a VTOL drone aircraft can have both electric and carbon fuel-based power sources. A vertical lift system can be electrically powered, and a separate horizontal propulsion system can be powered by any combination of electric and carbon fuel sources. In some arrangements, only electrical power is used for the vertical lift system, while only heavy fuel is used for the separate forward propulsion system. An onboard electric generator can be coupled to the heavy fuel engine to supplement power to the vertical lift system when needed, as well as to recharge the battery that supplies electrical power to the vertical lift propellers. A clutch coupled to the thrust propeller of the heavy fuel engine can regulate whether all, some, or none of the power being generated by the heavy fuel engine is delivered to the thrust propeller. A dedicated power regulation controller can direct operations of the battery, generator, clutch, and other system components in a dynamic manner that varies based on changing conditions during flight.

Although various embodiments disclosed herein discuss hybrid drone aircraft configured as VTOL drones with a battery to provide electrical power and a heavy fuel combustion engine as an additional power source, it will be readily appreciated that the disclosed features, apparatuses, systems, and methods can similarly be used for any relevant hybrid drone having multiple power sources. For example, a hybrid drone configured primarily for regular fixed wing flight may also make use of the disclosed dedicated power regulation controller to regulate power intelligently. Other power source configurations are also possible, such as a light fuel system and heavy fuel system, or an electrical system and a second power system having a combination of combustion power and electrical power. In some arrangements, the internal combustion engine need not be a heavy fuel engine and can instead run on gasoline or any other type of suitable fuel. Other applications, arrangements, and extrapolations beyond the illustrated embodiments are also contemplated.

Referring first to FIG. 1, an example hybrid VTOL drone aircraft is illustrated in front perspective view. Drone 100 can be configured as a VTOL aircraft that includes a fuselage 101, a center wing 102, two outer wings 103, two booms 104 having multiple lift propellers 111 driven by electrically powered motors 110, an empennage assembly 105, and an internal combustion engine 120 having a thrust propeller 121, among other possible components. Each of these items can be a self-contained module that is readily removable and interchangeable with other similar modules. Drone 100 can also have a primary processor (not shown) that is configured to direct overall operations of the drone. Overall operations can include functions involving, for example, motors, speed control units, servo based ailerons, tabs, and rudders, a navigation system, a GPS system, an avionics module, a radio communications assembly, a sensor package assembly, an ISR assembly, a deployable payload assembly, and a landing gear arrangement, among other possible items.

The VTOL (i.e., vertical lift) system, including motors 110 and lift propellers 111, can be powered by a first power source that can be electrical, such as one or more batteries configured to provide electrical power in distributed fashion to the motors and lift propellers. Battery power is ideally suited for the vertical lift system because many aircraft types use a distributed propulsion system, and electrical power provides a simple and reliable way of distributing the power. While multiple batteries may be used to power the motors 110 and lift propellers 111 of the VTOL system, reference to a single battery is made herein for purposes of simplicity in discussion.

A second disparate power source can be the internal combustion engine 120, which drives the thrust propeller 121 to provide horizontal thrust for the drone 100. This internal combustion engine can be a heavy fuel engine that runs on, for example, diesel, biodiesel, kerosene, JP-5, JP-8, or any other suitable heavy fuel. As will be readily appreciated, heavy fuel has the advantage of lower flammability relative to gasoline, greater energy per unit mass, and is commonly used aboard ships and throughout the military. These features make heavy fuel a highly desirable fuel source for many internal combustion engines.

Figure 2A:
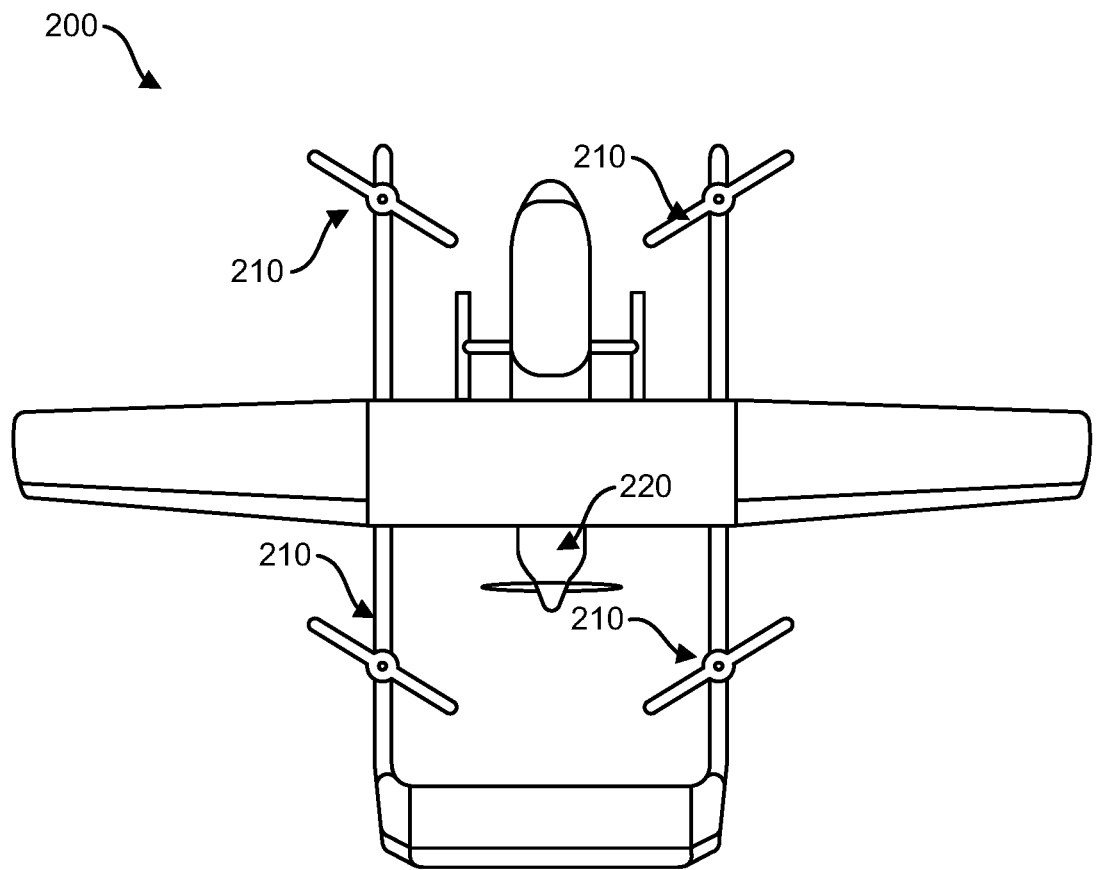
FIG. 2A illustrates in top plan view an example alternative hybrid VTOL drone aircraft according to one embodiment of the present disclosure.
Figure 2B:
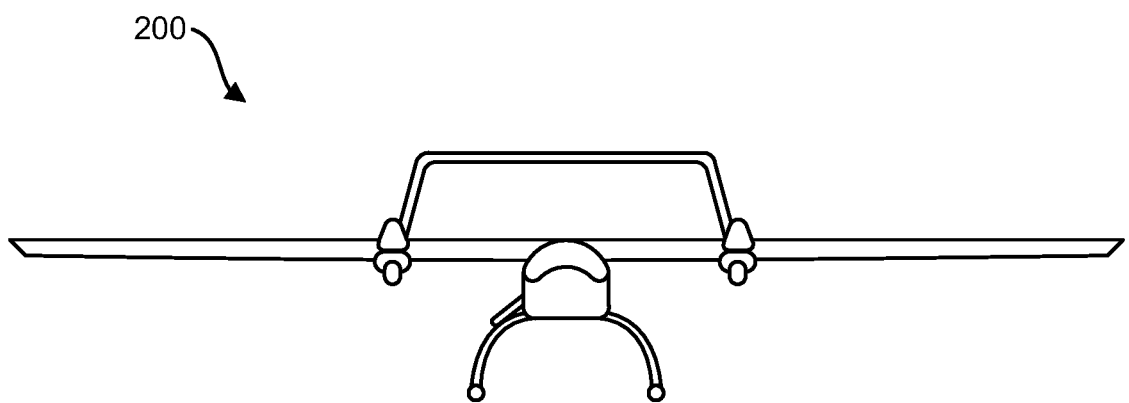
FIG. 2B illustrates in front elevation view the example alternative hybrid VTOL drone aircraft of FIG. 2A according to one embodiment of the present disclosure.

FIGS. 2A and 2B depict an alternative hybrid VTOL drone aircraft in top plan and front elevation views respectively. Alternative drone 200 can be substantially similar to drone 100 above, in that it uses an electrical power source to drive its VTOL lift components 210 and an internal combustion engine 220 to drive its horizontal thrust components. Unlike drone 100, which has eight lift propellers, drone 200 is a quadcopter that utilizes only four lift propellers. Other numbers of lift propellers may also be possible in alternative configurations.

Both drone 100 and drone 200 can have additional components that are similar to facilitate intelligent management of the disparate power sources aboard the aircraft. For example, an onboard electrical generator (not shown) can be coupled to the internal combustion engine to receive power therefrom and convert the carbon fuel-based power to electrical power. The generator can then provide the electrical power to recharge a rechargeable battery (not shown) that is used to power the VTOL lift components. In some arrangements, the generator can also provide electrical power directly to the VTOL lift components. A mechanical clutch (not shown) may also couple to the thrust propeller in order to regulate the amount of power delivered to the thrust propeller regardless of the level at which the internal combustion engine is being driven.

A dedicated power regulation controller (not shown) can intelligently manage and coordinate various operations of the rechargeable battery, the internal combustion engine, the generator, and the clutch, among other power generating and distributing components. The power regulation controller can be in communication with the primary processor and can provide a number of particular functions that manage the use of power from the multiple disparate power sources onboard the drone. For example, the power regulation controller can augment electrical power when the drone is in vertical flight mode by drawing power from the internal combustion engine to the generator and then distributing electrical power elsewhere about the drone as needed.

The power regulation controller can also manage recharging of the battery at various times when the drone is in flight. For example, power can again be drawn from the internal combustion engine to the generator and then provided as electrical power to the battery whenever maximum thrust power is not required from the internal combustion engine. The power regulation controller can also prevent operation of the generator when peak power is needed from the internal combustion engine for the thrust propeller. In some instances, the power regulation controller can direct power delivery from the generator to the rechargeable battery until the rechargeable battery is full. In some instances, the power regulation controller can direct power delivery from the generator to the rechargeable battery until the rechargeable battery is recharged to a desired level, such as enough to provide sufficient electrical power to the lift propellers for landing the drone, for example.

The power regulation controller can also direct operation of the clutch such that a variable amount of carbon-based power is provided to the thrust propeller as may be needed, with the remaining carbon-based power then being diverted to the generator. As such, the power regulation controller can be in communication with the clutch and be configured to disengage the clutch by a variable amount to limit the delivery of power to the thrust propeller when the internal combustion engine is active. In some instances, the power regulation controller can fully disengage the clutch and direct a full power use of the internal combustion engine to deliver no power to the thrust propeller and full power to the generator. For example, the power regulation controller can be configured to fully disengage the clutch when the drone is operating in a hover mode or a vertical lift or descend mode.

In some embodiments, alternative arrangements other than a clutch can be used to limit the amount of power delivered to the thrust propeller. It is generally well known that clutches can be relatively heavy and that combustion engines can have a natural resistance to being spun from the outside due to cylinder compression. Accordingly, rather than use a clutch, some or all of the cylinder valves can be manipulated to regulate power delivered to the thrust propeller in different circumstances. For example, when electrical power generation is desired, the cylinder valves can be forced open to allow wind to actuate the propeller and render the engine to a free-wheel state. This can then utilize the generator at a maximum level to generate electric energy. This alternative arrangement can be used to generate electrical power intelligently, such as, for example, when descending the drone from a high altitude down to close to transition altitude, at which point the rechargeable batteries can have a higher state of charge from such a form of "regenerative braking."

Various ways of disengaging the engine from the power train can be implemented in order to allow the thrust propeller to back-drive the generator system during a long descent or deceleration maneuver. Compression load from the engine can be reduced by including a compression relief valve so that the cylinder(s) no longer compress air and the engine can be easily "back-driven" by a free wind propeller. A fuel shut-off can be implemented to prevent unburned fuel from being pumped through the engine and possibly restarting of the engine while airborne. These and other alternative systems and features can all be managed by an onboard processor (e.g., power regulation controller) to control their functions in an optimal manner for energy harvesting and flight safety. Alternatively, the engine, propeller, and generator system can be connected by a transmission as is done with parallel hybrid or parallel-series hybrid systems used in automobiles. This can allow the electric motor, engine, and propeller to spin at different rates in order to optimize their efficiencies.

In some arrangements the generator can be driven as an electric motor, such that electrical power from the battery can be provided to the generator to then provide auxiliary power to the thrust propeller when needed. In this manner, power beyond the maximum deliverable capability of the internal combustion engine can be delivered to the thrust propeller as circumstances may warrant. The power regulation controller may also be configured to alter its power regulation operations based on different cargo contents carried by the drone. For example, where a payload carried by the drone is particularly large, then preference can be given to operating the internal combustion engine at a greater than normal rate to account for the added weight of the large payload. As another example, where a payload may have temperature sensitive items, then preference can be given to operating the internal combustion engine at a lower than normal rate so as not to unduly raise the temperature of drone components near the payload.

In various further arrangements, the power regulation controller can be further configured to alter the blade pitch of the thrust propeller when the internal combustion engine is being run at a high level but no horizontal thrust is desired. Accordingly, a specialized thrust propeller having an adjustable blade pitch may be used. The power regulation controller can be in communication with the specialized thrust propeller in order to control its blade pitch to a desired level that reflects the thrust desired. Other specialized functions of the power regulation controller are also possible, as will be appreciated.

Figure 3:
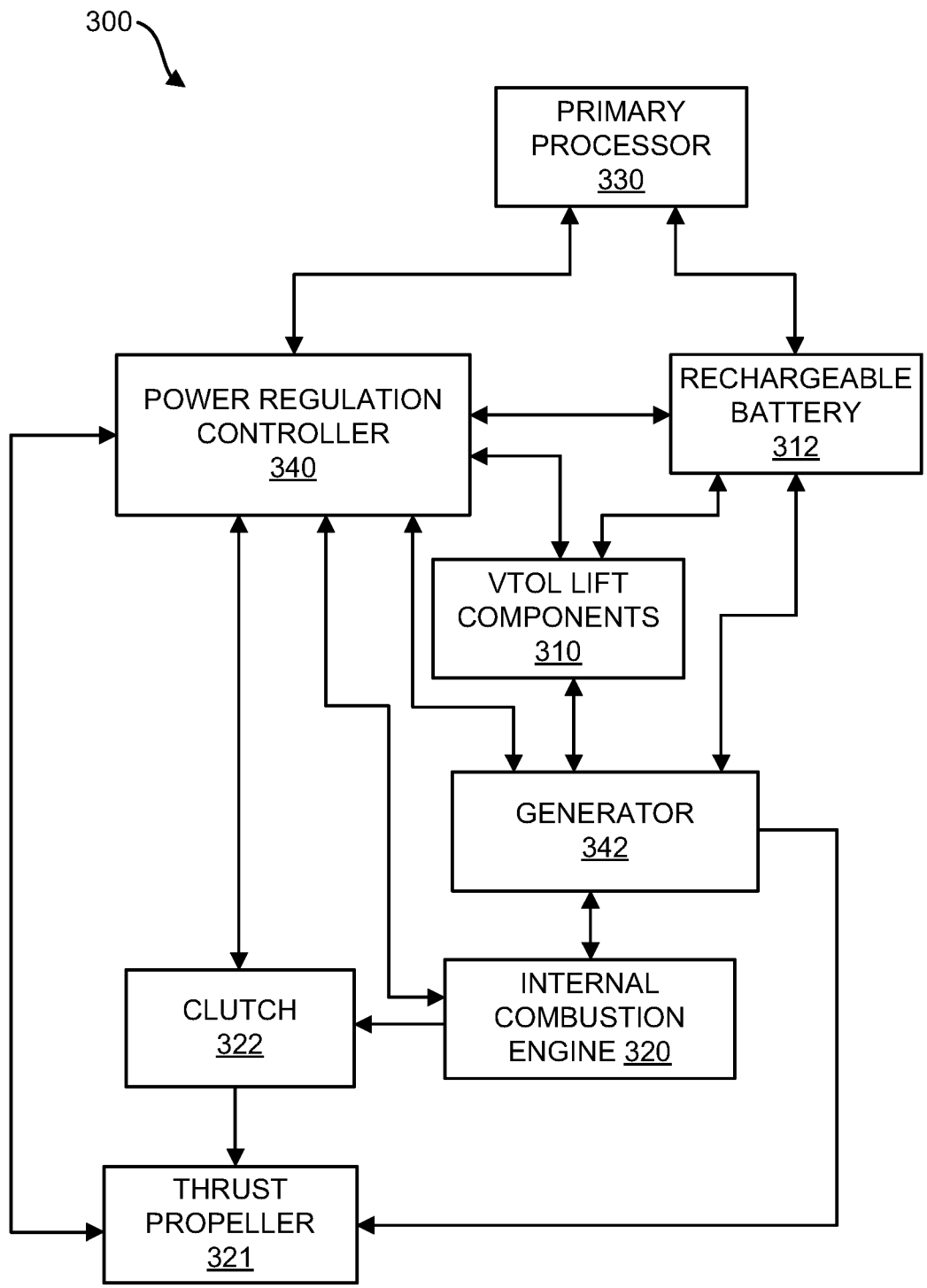
FIG. 3 illustrates a block diagram of an example computing architecture for a hybrid VTOL drone aircraft according to one embodiment of the present disclosure.

Turning next to FIG. 3, a block diagram of an example computing architecture for a hybrid VTOL drone aircraft is provided. Computing architecture 300 can include a primary processor 330 that is configured to direct overall operations of the drone, a rechargeable battery 312 that provides electrical power to the primary processor 330 and a set of VTOL lift components 310, which can include lift propellers. An internal combustion engine 320 can provide power to a thrust propeller 321 by way of a variable clutch 322, and a generator 342 can convert power output from the internal combustion engine 320 into electrical power that can be provided to the rechargeable battery 312 and the VTOL lift components 310, among other possible system components.

A power regulation controller 340 can be in communication with all other components and can be configured to intelligently control various operations of each of the other components, as detailed above. For example, power regulation controller 340 can adjust the level of variable clutch 322 in order to divert a specific amount of power from internal combustion engine 320 to the generator 342. The generator 342 can then provide electrical to various other components. As another example, power regulation controller 340 can divert power from the rechargeable battery 312 to the generator 342, which can in turn provide auxiliary power to the thrust propeller 321. Various details regarding the functions and interactions of each of the items shown in computing architecture 300 can be the same as those set forth above in the descriptions for drone 100 and drone 200.

Figure 4:
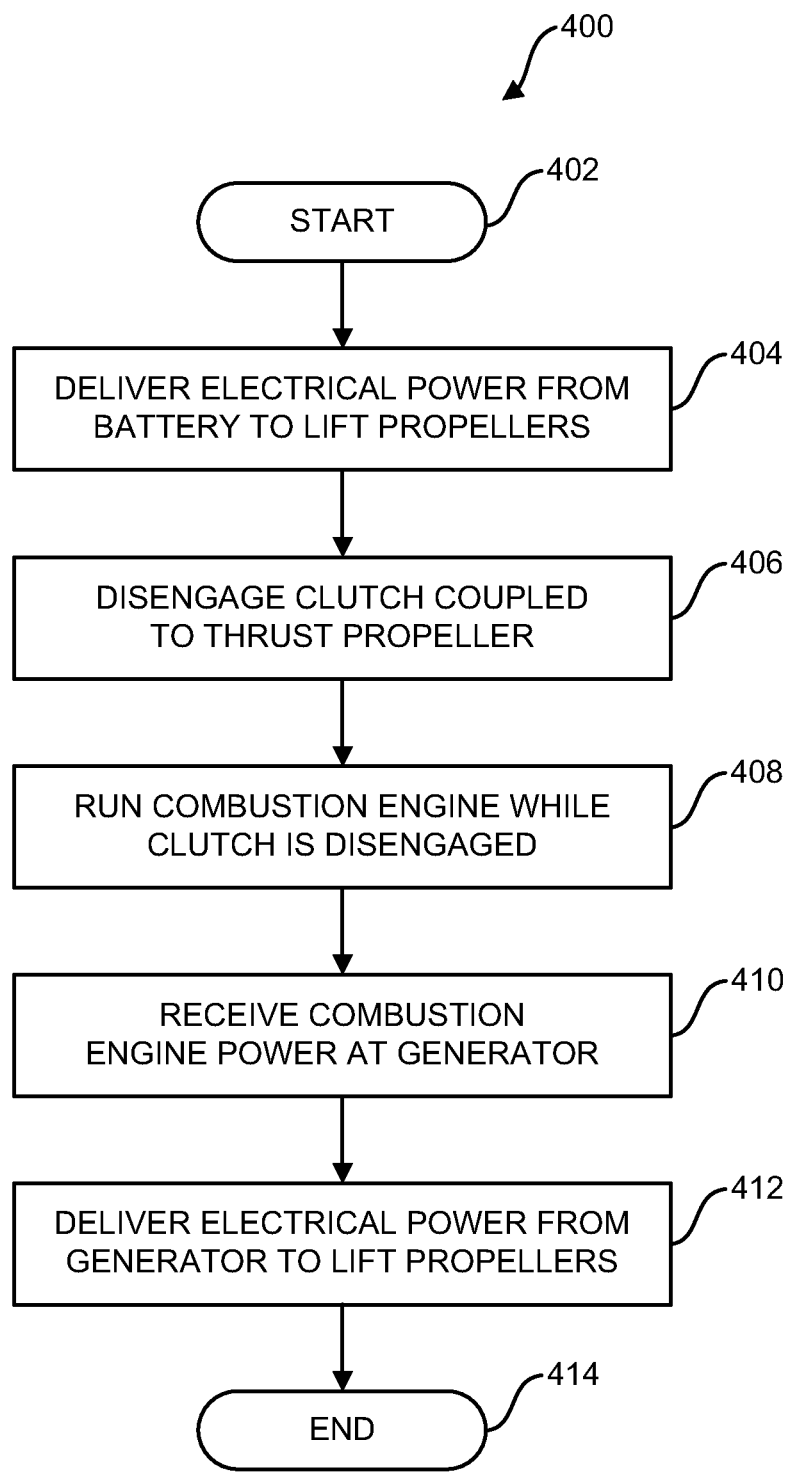
FIG. 4 illustrates a flowchart of an example method of regulating power delivery in a hybrid VTOL drone aircraft during a vertical take-off process according to one embodiment of the present disclosure.

Various methods or processes can apply for operation of the example hybrid VTOL drone aircraft described in detail above. In particular, these methods can include intelligent power regulation processes involving a dedicated power regulation controller. A flowchart 400 of an example method of regulating power delivery in a hybrid VTOL drone aircraft during a vertical take-off process is provided in FIG. 4. After start step 402, electrical power can be delivered from a rechargeable battery to a plurality of lift propellers at process step 404. At process step 406, a clutch coupled to a thrust propeller powered by an internal combustion engine can be disengaged.

At a following process step 408, an internal combustion engine can be run while the clutch is disengaged. This can involve no power being provided to the thrust propeller while the clutch is disengaged. Power from the internal combustion engine can be received at a generator at a process step 410, after which electrical power is delivered from the generator directly to the plurality of lift propellers at process step 412. This can reduce the amount of electrical power needed from the rechargeable battery to power the lift propellers. Each of process steps 404-412 can be controlled automatically by a power regulation controller during a vertical take-off process of the VTOL drone aircraft. The method then ends at end step 414.

Figure 5:
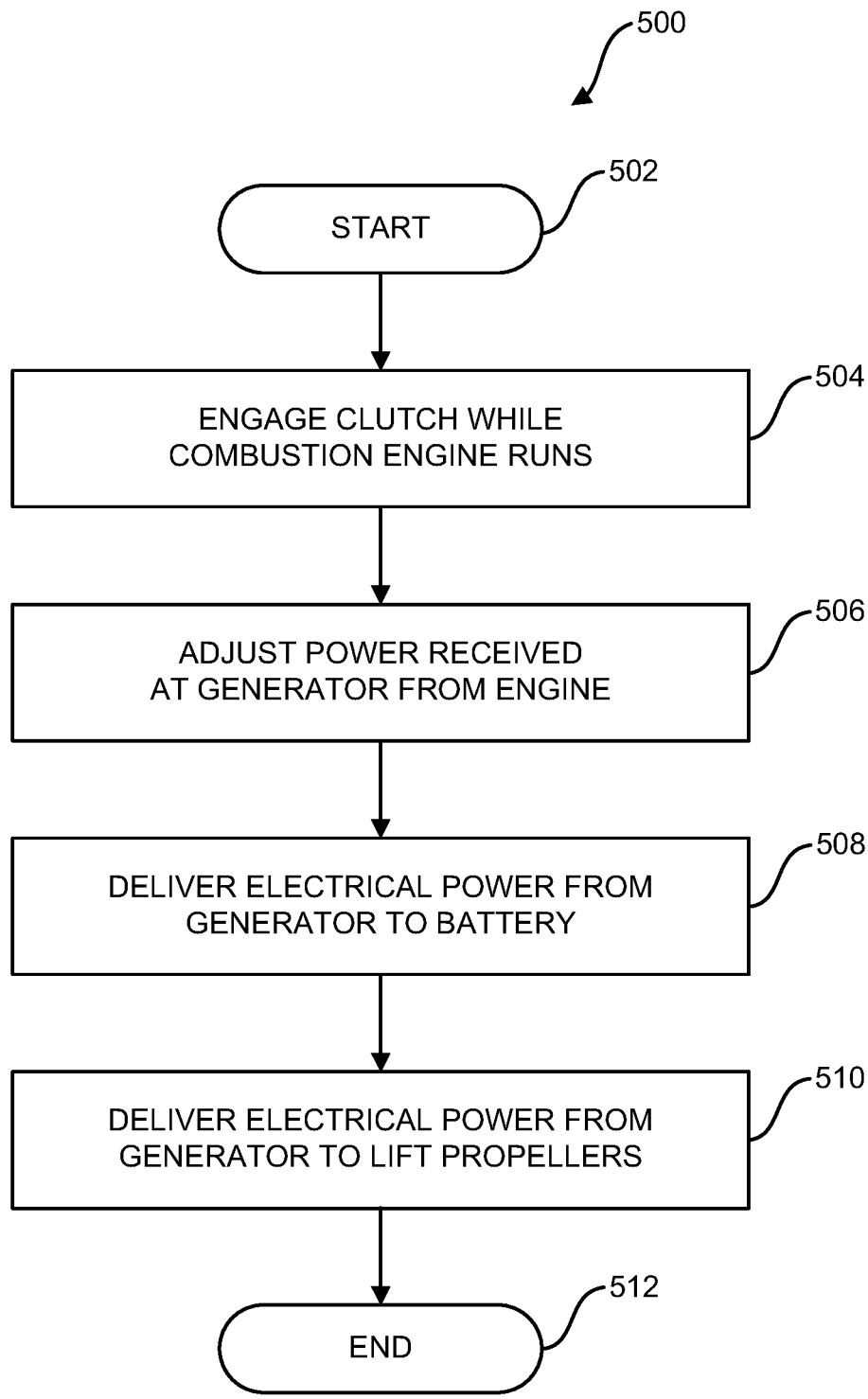
FIG. 5 illustrates a flowchart of an example method of regulating power delivery in a hybrid VTOL drone aircraft during flight and landing processes according to one embodiment of the present disclosure.

Lastly, FIG. 5 provides a flowchart 500 of an example method of regulating power delivery in a hybrid VTOL drone aircraft during flight and landing processes. After start step 502, a clutch can be engaged while the internal combustion engine remains running at process step 504. This engaging can be controlled automatically by a power regulation controller during a transition of the VTOL drone aircraft from a vertical take-off process to a wing-borne flight process. At a following process step 506, the amount of power received at the generator from the internal combustion engine can be adjusted. Electrical power can then be delivered from the generator to the rechargeable battery to recharge the rechargeable battery to a sufficient level at process step 508. Both of steps 506 and 508 can be controlled automatically by the power regulation controller while the VTOL drone aircraft is in a cruise flight mode.

At a final process step 510, electrical power can be delivered from the generator directly to the lift propellers, so as to reduce the amount of electrical power needed from the rechargeable battery. This can be controlled automatically by the power regulation controller during a landing process of the VTOL drone aircraft. Additional steps not shown prior to process step 510 can include re-disengaging the clutch, running the internal combustion engine while the clutch is re-disengaged, wherein no power is provided to the thrust propeller while the clutch is re-disengaged, and receiving power from the internal combustion engine at the generator.

Again, all such steps can be controlled automatically by the power regulation controller as part of a landing process. The method then ends at end step 512.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A Vertical Take-Off and Landing ("VTOL") drone aircraft, comprising:
    a rechargeable battery configured to deliver electrical power to the VTOL drone aircraft;
    a primary processor powered by the rechargeable battery, wherein the primary processor directs overall operations of the VTOL drone aircraft;
    a plurality of lift propellers in communication with the primary processor and powered by the rechargeable battery, wherein the plurality of lift propellers provides vertical lift for the VTOL drone aircraft;
    an internal combustion engine in communication with the primary processor, wherein the internal combustion engine includes a thrust propeller that provides horizontal thrust for the VTOL drone aircraft;
    a generator configured to receive power from the internal combustion engine and deliver electrical power to the rechargeable battery to recharge the rechargeable battery;
    a power regulation controller in communication with the primary processor, the rechargeable battery, the internal combustion engine, and the generator, wherein the power regulation controller is configured to regulate dynamically power delivery from the internal combustion engine to the thrust propeller and the generator, and from the generator to the rechargeable battery based upon changing conditions during flight of the VTOL drone aircraft; and
    a clutch coupled to the thrust propeller, wherein the power regulation controller is in communication with the clutch and is configured to disengage the clutch by a variable amount to limit the delivery of power to the thrust propeller when the internal combustion engine is active.

2. The VTOL drone aircraft of claim 1, wherein the generator is further configured to deliver electrical power directly to the plurality of lift propellers under direction of the power regulation controller.

3. The VTOL drone aircraft of claim 1, wherein the power regulation controller prevents operation of the generator when peak power is needed from the internal combustion engine for the thrust propeller.

4. The VTOL drone aircraft of claim 1, wherein the internal combustion engine is a heavy fuel engine powered by diesel fuel, biodiesel fuel, kerosene, JP-5 fuel, or JP-8 fuel.

5. The VTOL drone aircraft of claim 1, wherein the power regulation controller is configured to fully disengage the clutch and direct a full power use of the internal combustion engine to deliver no power to the thrust propeller and full power to the generator.

6. The VTOL drone aircraft of claim 5, wherein when the power regulation controller is configured to fully disengage the clutch when the VTOL drone aircraft is operating in a hover mode.

7. The VTOL drone aircraft of claim 1, wherein only electrical power is used to provide vertical lift to the VTOL drone aircraft.

8. The VTOL drone aircraft of claim 1, wherein only internal combustion power is used to provide horizontal thrust to the VTOL drone aircraft.

9. The VTOL drone aircraft of claim 1, wherein the generator is further configured to receive power from the rechargeable battery and deliver auxiliary power to the thrust propeller.

10. The VTOL drone aircraft of claim 1, wherein the power regulation controller directs power delivery from the generator to the rechargeable battery until the rechargeable battery is full.

11. The VTOL drone aircraft of claim 1, wherein the power regulation controller directs power delivery from the generator to the rechargeable battery until the rechargeable battery is recharged to a level to provide sufficient electrical power to the lift propellers for landing the VTOL drone aircraft.

12. The VTOL drone aircraft of claim 1, wherein the power regulation controller is further configured to alter a blade pitch of the thrust propeller.

13. A method of regulating power delivery in a VTOL drone aircraft, the method comprising:
    delivering electrical power from a rechargeable battery to a plurality of lift propellers;
    disengaging a clutch coupled to a thrust propeller powered by an internal combustion engine;
    running the internal combustion engine while the clutch is disengaged, wherein no power is provided to the thrust propeller while the clutch is disengaged;
    receiving power from the internal combustion engine at a generator; and
    delivering electrical power from the generator directly to the plurality of lift propellers to reduce an amount of electrical power needed from the rechargeable battery, wherein the delivering, disengaging, running, receiving, and delivering are all controlled automatically by a power regulation controller during a vertical take-off process of the VTOL drone aircraft.

14. The method of claim 13, wherein the internal combustion engine is run at full capacity to provide maximum load to the generator.

15. The method of claim 13, wherein delivering electrical power from the generator includes delivering electrical power to the rechargeable battery.

16. The method of claim 13, further including the step of:
    engaging the clutch while the internal combustion engine remains running, wherein the engaging is controlled automatically by the power regulation controller during a transition of the VTOL drone aircraft from the vertical take-off process to a wing-borne flight process.

17. The method of claim 16, further including the steps of:
    adjusting an amount of power received at the generator from the internal combustion engine; and
    delivering electrical power from the generator to the rechargeable battery to recharge the rechargeable battery to a sufficient level, wherein the adjusting and delivering are controlled automatically by the power regulation controller while the VTOL drone aircraft is in a cruise flight mode.

18. The method of claim 17, further including the steps of:

re-disengaging the clutch;

running the internal combustion engine while the clutch is re-disengaged, wherein no power is provided to the thrust propeller while the clutch is re-disengaged;

receiving power from the internal combustion engine at the generator; and delivering electrical power from the generator directly to the plurality of lift propellers to reduce the amount of electrical power needed from the rechargeable battery, wherein the re-disengaging, running, receiving, and delivering are all controlled automatically by a power regulation controller during a landing process of the VTOL drone aircraft.

* * * * *